(12) United States Patent
Bruno et al.

(10) Patent No.: US 11,851,190 B2
(45) Date of Patent: Dec. 26, 2023

(54) AIRCRAFT ENVIRONMENTAL CONTROL SYSTEM

(71) Applicant: Hamilton Sundstrand Corporation, Charlotte, NC (US)

(72) Inventors: Louis J. Bruno, Ellington, CT (US); Tony Ho, Glastonbury, CT (US); Aiden Coutin, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/390,167

(22) Filed: Jul. 30, 2021

(65) Prior Publication Data

US 2022/0033086 A1 Feb. 3, 2022

Related U.S. Application Data

(60) Provisional application No. 63/058,834, filed on Jul. 30, 2020.

(51) Int. Cl.
*B64D 13/06* (2006.01)
*F25B 9/00* (2006.01)
(Continued)

(52) U.S. Cl.
CPC ............ *B64D 13/06* (2013.01); *B64D 13/08* (2013.01); *F25B 9/004* (2013.01); *F25B 9/06* (2013.01);
(Continued)

(58) Field of Classification Search
CPC ................... B64D 13/06; B64D 13/08; B64D 2013/0618; B64D 2013/0648; B64D 2013/0662; F25B 9/004; F25B 9/06
(Continued)

(56) References Cited

U.S. PATENT DOCUMENTS 2,777,301 A 1/1957 John
4,374,469 A 2/1983 Rannenberg
(Continued)

FOREIGN PATENT DOCUMENTS

CN 108357682 A 8/2018
EP 1112930 A2 7/2001
(Continued)

OTHER PUBLICATIONS

European Extended Search Report; European Application No. 21188717.9; dated Jan. 4, 2022; 11 pages.
(Continued)

*Primary Examiner* — Steve S Tanenbaum
(74) *Attorney, Agent, or Firm* — CANTOR COLBURN LLP

(57) ABSTRACT

An environmental control system of an aircraft includes a ram air circuit including a ram air shell having at least one heat exchanger positioned therein and a divider arranged within the ram air shell to separate the ram air shell into a first region and a second region. The at least one heat exchanger is arranged within both the first region and the second region. A first medium is configured to flow through the first region and a second, distinct medium is configured to flow through the second region. The environmental control system additionally includes a dehumidification system arranged in fluid communication with the ram air circuit and a compression device arranged in fluid communication with the ram air circuit and the dehumidification system.

12 Claims, 6 Drawing Sheets

(51) Int. Cl.
*F25B 9/06* (2006.01)
*B64D 13/08* (2006.01)

(52) U.S. Cl.
CPC .............. *B64D 2013/064* (2013.01); *B64D 2013/0618* (2013.01); *B64D 2013/0648* (2013.01); *B64D 2013/0662* (2013.01)

(58) Field of Classification Search
USPC .......................................................... 62/402
See application file for complete search history.

(56) References Cited

U.S. PATENT DOCUMENTS

| | | | |
|---|---|---|---|
| 4,419,926 | A | 12/1983 | Cronin et al. |
| 5,299,763 | A | 4/1994 | Bescoby et al. |
| 5,442,905 | A | 8/1995 | Claeys et al. |
| 5,461,882 | A | 10/1995 | Zywiak |
| 5,887,445 | A | 3/1999 | Murry et al. |
| 5,899,085 | A | 5/1999 | Williams |
| 6,128,909 | A | 10/2000 | Jonqueres |
| 6,148,622 | A | 11/2000 | Sanger |
| 6,199,387 | B1 | 3/2001 | Sauterleute |
| 6,250,097 | B1 | 6/2001 | Lui et al. |
| 6,526,775 | B1 | 3/2003 | Asfia et al. |
| 6,684,660 | B1 | 2/2004 | Bruno et al. |
| 6,981,388 | B2 | 1/2006 | Brutscher et al. |
| 7,578,136 | B2 | 4/2009 | Derouineau et al. |
| 7,673,459 | B2 | 3/2010 | Sheldon et al. |
| 9,481,468 | B1 | 11/2016 | Schiff |
| 9,555,893 | B2 | 1/2017 | Squier |
| 9,669,936 | B1 | 6/2017 | Fiterman et al. |
| 10,137,993 | B2 | 11/2018 | Bruno et al. |
| 10,160,547 | B2 | 12/2018 | Bruno et al. |
| 10,202,197 | B2 | 2/2019 | Bammann et al. |
| 10,207,809 | B2 | 2/2019 | Koerner et al. |
| 10,232,948 | B2 | 3/2019 | Bruno et al. |
| 10,239,624 | B2 | 3/2019 | Behrens et al. |
| 10,457,399 | B2 | 10/2019 | Bammann et al. |
| 10,501,191 | B1 | 12/2019 | Dooley et al. |
| 10,526,092 | B2 | 1/2020 | Defrancesco |
| 10,549,860 | B2 | 2/2020 | Bruno et al. |
| 10,569,886 | B2 | 2/2020 | Klimpel et al. |
| 10,633,098 | B2 | 4/2020 | Shea |
| 2004/0172963 | A1 | 9/2004 | Axe et al. |
| 2015/0166187 | A1 | 6/2015 | Durbin et al. |
| 2015/0329210 | A1 | 11/2015 | Bammann et al. |
| 2016/0083100 | A1 | 3/2016 | Bammann et al. |
| 2016/0347456 | A1 | 12/2016 | Bruno et al. |
| 2017/0341758 | A1 | 11/2017 | Bruno et al. |
| 2017/0341761 | A1 | 11/2017 | Bruno et al. |
| 2017/0341768 | A1* | 11/2017 | Bruno ................ B64D 13/06 |
| 2017/0342838 | A1 | 11/2017 | Bruno et al. |
| 2018/0057172 | A1 | 3/2018 | Sautron |
| 2018/0215473 | A1 | 8/2018 | Army et al. |
| 2018/0237143 | A1 | 8/2018 | Bombled et al. |
| 2018/0297709 | A1 | 10/2018 | Bruno et al. |
| 2019/0002108 | A1 | 1/2019 | Bruno |
| 2019/0112052 | A1 | 4/2019 | Bruno et al. |
| 2019/0135440 | A1 | 5/2019 | Bruno et al. |
| 2019/0225343 | A1 | 7/2019 | Bruno et al. |
| 2019/0291875 | A1 | 9/2019 | Behrens et al. |
| 2019/0389587 | A1 | 12/2019 | Bruno et al. |
| 2020/0182550 | A1 | 6/2020 | Army et al. |
| 2021/0001992 | A1 | 1/2021 | Ho et al. |
| 2022/0033084 | A1 | 2/2022 | Bruno et al. |
| 2022/0033085 | A1 | 2/2022 | Bruno et al. |
| 2022/0033087 | A1 | 2/2022 | Bruno et al. |
| 2022/0033089 | A1 | 2/2022 | Bruno et al. |
| 2022/0033090 | A1 | 2/2022 | Bruno et al. |
| 2022/0033091 | A1 | 2/2022 | Bruno et al. |
| 2022/0033092 | A1 | 2/2022 | Bruno et al. |
| 2022/0033093 | A1 | 2/2022 | Bruno et al. |

FOREIGN PATENT DOCUMENTS

| | | |
|---|---|---|
| EP | 2862803 A1 | 4/2015 |
| EP | 2937287 A1 | 10/2015 |
| EP | 2939927 A1 | 11/2015 |
| EP | 3248879 A1 | 11/2017 |
| EP | 3249198 A1 | 11/2017 |
| EP | 3354573 A1 | 8/2018 |
| EP | 3354576 A1 | 8/2018 |
| EP | 3363740 A1 | 8/2018 |
| EP | 3489142 A1 | 11/2018 |
| EP | 3098165 B1 | 1/2019 |
| EP | 3470337 A1 | 4/2019 |
| EP | 3480113 A1 | 5/2019 |
| EP | 3514065 A1 | 7/2019 |
| EP | 3543131 A1 | 9/2019 |
| EP | 3587269 A1 | 1/2020 |
| EP | 3760542 A1 | 6/2021 |
| EP | 3835209 A1 | 6/2021 |
| GB | 2398864 A | 9/2004 |
| JP | 2001328596 A | 11/2001 |
| JP | 2005067356 A | 3/2005 |
| JP | 2006078092 A | 3/2006 |

OTHER PUBLICATIONS

European Extended Search Report; European Application No. 21188736.9; dated Jan. 4, 2022; 11 pages
European Extended Search Report; European Application No. 21188746.8; dated Jan. 4, 2022; 11 pages
European Extended Search Report; European Application No. 21188755.9; dated Jan. 4, 2022; 10 pages
European Extended Search Report; European Application No. 21188762.5; dated Jan. 4, 2022; 12 pages
European Extended Search Report; European Application No. 21188779.9; dated Jan. 4, 2022; 8 pages
European Extended Search Report; European Application No. 21188819.3; dated Jan. 4, 2022; 9 pages
European Extended Search Report; European Application No. 21188914.2; dated Jan. 4, 2022; 9 pages.
European Extended Search Report; European Application No. 21188926.6; dated Jan. 5, 2022; 8 pages.
U.S. Non-Final Office Action dated Mar. 1, 2023 for U.S. Appl. No. 17/390,077, filed Jul. 30, 2021; (pp. 1-28)
U.S. Non-Final Office Action dated Mar. 17, 2023 for U.S. Appl. No. 17/390,188, filed Jul. 30, 2021; (pp. 1-37).
U.S. Non-Final Office Action dated Nov. 17, 2022 for U.S. Appl. No. 17/390,095, filed Jul. 30, 2021; Report dated Nov. 17, 2022 (pp. 1-25).
U.S. Non-Final Office Action dated Nov. 16, 2022 for U.S. Appl. No. 17/390,139, filed Jul. 30, 2021; Report dated Nov. 16, 2022 (pp. 1-22).
U.S. Non-Final Office Action dated Dec. 22, 2022 for U.S. Appl. No. 17/390,167, filed Jul. 30, 2021; Report dated Dec. 22, 2022 (pp. 1-25).
U.S. Non-Final Office Action dated Jan. 5, 2023 for U.S. Appl. No. 17/390,116, filed Jul. 30, 2021; Report dated Jan. 5, 2023 (pp. 1-22).
European Office Action for European Application No. 21188717.9; dated May 24, 2023 (pp. 1-6).
European Office Action; European Application No. 21188736.9; dated May 23, 2023; 6 pages.
European Office Action; European Application No. 21188746.8; dated May 24, 2023; 6 pages.
European Office Action; European Application No. 21188755.9; dated May 30, 2023; 5 pages.
European Office Action; European Application No. 21188762.5; dated May 30, 2023; 5 pages.
U.S. Non-Final Office Action dated Jun. 5, 2023 for U.S. Appl. No. 17/390,200; filed Jul. 30, 2021; (pp. 1-7).
U.S. Non-Final Office Action dated for U.S. Appl. No. 17/390,042; filed Jul. 30, 2021; dated Aug. 1, 2023 (pp. 1-7).

(56) References Cited

OTHER PUBLICATIONS

U.S. Final Office Action dated for U.S. Appl. No. 17/390,188; filed Jul. 30, 2021; dated Aug. 18, 2023 (pp. 1-18).

* cited by examiner

AIRCRAFT ENVIRONMENTAL CONTROL SYSTEM

CROSS-REFERENCE TO RELATED APPLICATIONS

This application claims the benefit of U.S. Provisional Application No. 63/058,834 filed Jul. 30, 2021, the disclosure of which is incorporated herein by reference in its entirety.

BACKGROUND

Embodiments of the disclosure relate to environmental control systems, and more specifically to an environmental control system of an aircraft.

Aircraft need to have their internal environment controlled. In general, contemporary air conditioning systems are supplied a pressure at cruise that is approximately 30 psig to 35 psig. The trend in the aerospace industry today is towards systems with higher efficiency. One approach to improve efficiency of an aircraft environmental control system is to eliminate the bleed air entirely and use electrical power to compress outside air. A second approach is to use lower engine pressure. The third approach is to use the energy in the cabin outflow air to compress outside air and bring it into the cabin. Each of these approaches provides a reduction in airplane fuel burn.

BRIEF DESCRIPTION

According to an embodiment, an environmental control system of an aircraft includes a ram air circuit including a ram air shell having at least one heat exchanger positioned therein and a divider arranged within the ram air shell to separate the ram air shell into a first region and a second region. The at least one heat exchanger is arranged within both the first region and the second region. A first medium is configured to flow through the first region and a second, distinct medium is configured to flow through the second region. The environmental control system additionally includes a dehumidification system arranged in fluid communication with the ram air circuit and a compression device arranged in fluid communication with the ram air circuit and the dehumidification system.

In addition to one or more of the features described above, or as an alternative, in further embodiments the at least one heat exchanger includes a first portion arranged within the first region and a second portion arranged within the second region, the second portion of the at least one heat exchanger is integrally formed with the first portion.

In addition to one or more of the features described above, or as an alternative, in further embodiments the second portion of the heat exchanger is a condenser of the dehumidification system.

In addition to one or more of the features described above, or as an alternative, in further embodiments the at least one heat exchanger includes a first heat exchanger arranged within the first region and a second heat exchanger arranged within the second region, the second heat exchanger being separate from and arranged in fluid communication with an outlet of the first heat exchanger.

In addition to one or more of the features described above, or as an alternative, in further embodiments the first medium is ram air.

In addition to one or more of the features described above, or as an alternative, in further embodiments the medium configured to flow through the second region is exhausted from the turbine of the compression device.

In addition to one or more of the features described above, or as an alternative, in further embodiments the medium configured to flow through the second region is bleed air.

In addition to one or more of the features described above, or as an alternative, in further embodiments the medium configured to flow through the second region is a mixture of bleed air and cabin discharge air.

In addition to one or more of the features described above, or as an alternative, in further embodiments comprising a fan arranged within the ram air shell to move the first medium across the at least one heat exchanger within the first region.

In addition to one or more of the features described above, or as an alternative, in further embodiments the fan is separate from the compression device.

In addition to one or more of the features described above, or as an alternative, in further embodiments the fan is electrically powered.

In addition to one or more of the features described above, or as an alternative, in further embodiments the fan is driven by a flow of medium provided thereto.

According to another embodiment, an environmental control system of an aircraft includes a plurality of inlets for receiving a plurality of mediums including a first medium and a second medium and an outlet for delivering a conditioned form of the second medium to at least one load of the aircraft. A ram air circuit includes a ram air shell having at least one heat exchanger positioned therein and a dehumidification system is arranged in fluid communication with the ram air circuit. A compression device is arranged in fluid communication with the ram air circuit and the dehumidification system. The compression device includes a compressor and a plurality of turbines including a first turbine and a second turbine operably coupled by a shaft. An outlet of the first turbine is directly coupled to an inlet of the second turbine, such that the first medium is provided to the first turbine and the second turbine in series.

In addition to one or more of the features described above, or as an alternative, in further embodiments the compressor is operable to receive a second medium, and the compressor is driven by work extracted from the first medium within the first turbine and the second turbine.

In addition to one or more of the features described above, or as an alternative, in further embodiments the first medium is bleed air and the second medium is fresh air.

In addition to one or more of the features described above, or as an alternative, in further embodiments plurality of turbines further comprises a third turbine, wherein an inlet of the third turbine is arranged in fluid communication with an outlet of the compressor.

In addition to one or more of the features described above, or as an alternative, in further embodiments the plurality of mediums includes a third medium and a flow of the third medium is arranged in fluid communication with the inlet of the second turbine.

In addition to one or more of the features described above, or as an alternative, in further embodiments the second medium and the third medium are mixed at a mixing point located upstream from the second turbine.

In addition to one or more of the features described above, or as an alternative, in further embodiments the second medium and the third medium are mixed at a mixing point located at an outlet of the second turbine.

In addition to one or more of the features described above, or as an alternative, in further embodiments the second turbine is a dual entry turbine having a first nozzle and a second nozzle, the outlet of the first turbine being directly coupled to the first nozzle, and the flow of third medium being connected to the second nozzle.

In addition to one or more of the features described above, or as an alternative, in further embodiments a flow output from the second turbine is used to cool a flow within the dehumidification system.

In addition to one or more of the features described above, or as an alternative, in further embodiments the ram air circuit further comprises a divider positioned to separate the ram air shell into a first region and a second region, wherein two distinct mediums are configured to flow through the first region and the second region, respectively.

In addition to one or more of the features described above, or as an alternative, in further embodiments the at least one heat exchanger includes a first portion arranged within the first region and a second portion arranged within the second region, the first portion and the second portion being integrally formed.

In addition to one or more of the features described above, or as an alternative, in further embodiments the at least one heat exchanger includes a first heat exchanger arranged within the first region and a second, distinct heat exchanger arranged within the second region, the second heat exchanger being arranged in fluid communication with an outlet of the first heat exchanger.

According to yet another embodiment, a compressing device for use in an environmental control system includes at least one turbine configured to provide energy by expanding one or more mediums. The one or more mediums provided at an outlet of the at least one turbine form a heat sink within the environmental control system. A compressor is configured to receive energy from the one or more mediums expanded across the at least one turbine. During a first mode of the compressing device, energy derived from a first medium and a second medium of the one or more mediums is used to compress a second medium at the compressor. During a second mode of the compressing device, energy derived from the first medium, the second medium, and a third medium of the one or more mediums is used to compress the second medium at the compressor.

In addition to one or more of the features described above, or as an alternative, in further embodiments the at least one turbine includes a first turbine configured to receive and extract work from the first medium and a second turbine configured to receive and extract work from the third medium.

In addition to one or more of the features described above, or as an alternative, in further embodiments the first turbine and the second turbine are arranged in series such that the second turbine is also configured to receive and extract work from the first medium.

In addition to one or more of the features described above, or as an alternative, in further embodiments the second turbine includes a first nozzle for receiving the first medium and a second nozzle for receiving the third medium.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
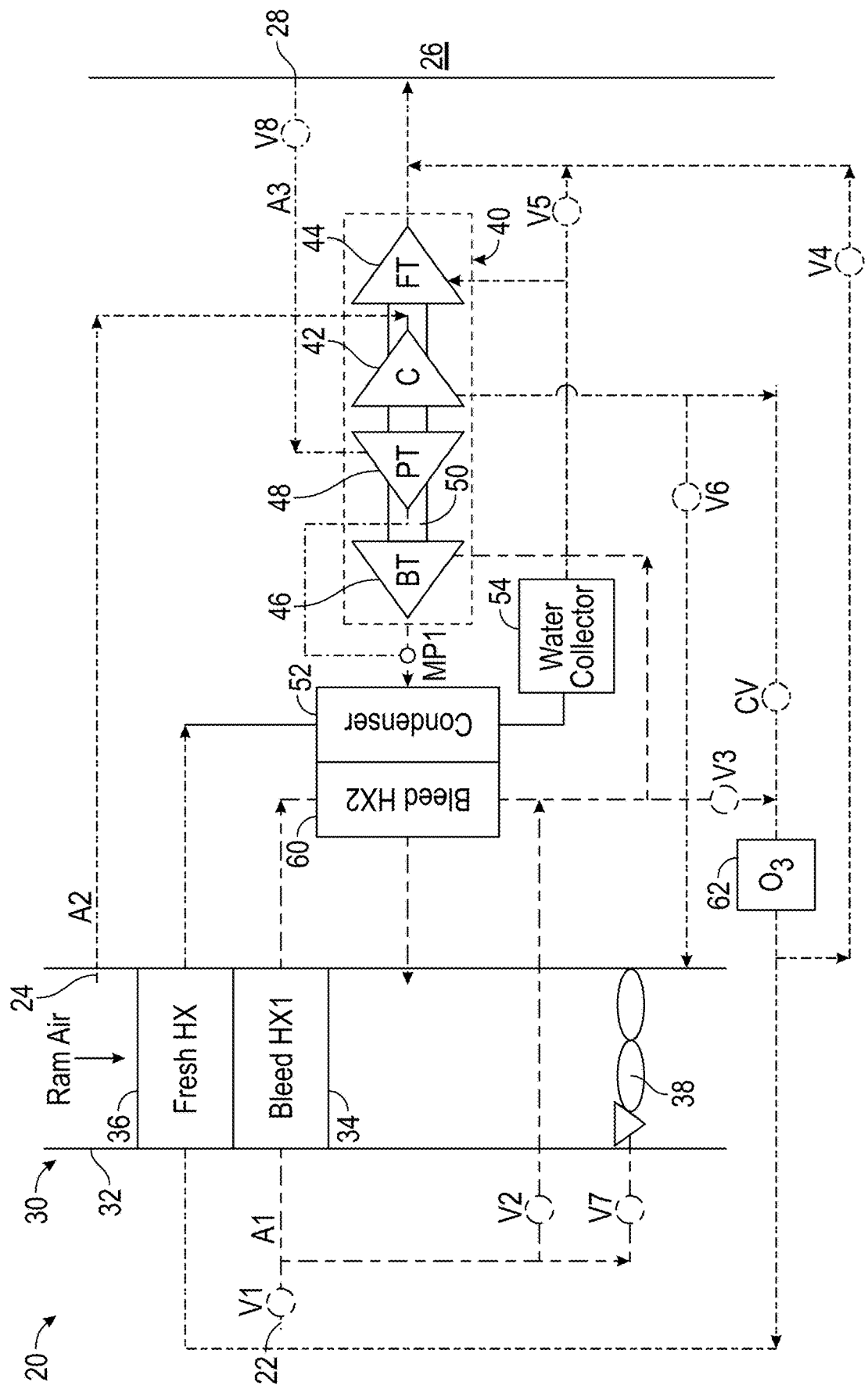
FIG. 1 is a simplified schematic of a system according to an embodiment.

A detailed description of one or more embodiments of the disclosed apparatus and method are presented herein by way of exemplification and not limitation with reference to the Figures.

Embodiments herein provide an environmental control system of an aircraft that mixes mediums from different sources to power the environmental control system and to provide cabin pressurization and cooling at a high fuel burn efficiency. The medium can generally be air, while other examples include gases, liquids, fluidized solids, or slurries.

With reference now to the figures, various schematic diagrams of a portion of an environment control system (ECS) 20, such as an air conditioning unit or pack for example, is depicted according to non-limiting embodiments. Although the environmental control system 20 is described with reference to an aircraft, alternative applications are also within the scope of the disclosure. As shown in the figures, the system 20 can receive a first medium A1 at a first inlet 22. In embodiments where the environmental control system 20 is used in an aircraft application, the first medium A1 is bleed air, which is pressurized air originating from i.e. being "bled" from, an engine or auxiliary power unit of the aircraft. It shall be understood that one or more of the temperature, humidity, and pressure of the bleed air can vary based upon the compressor stage and revolutions per minute of the engine or auxiliary power unit from which the air is drawn.

The system 20 is also configured to receive a second medium A2 at an inlet 24 and may provide a conditioned form of at least one of the first medium A1 and the second medium A2 to a volume 26. In an embodiment, the second medium A2 is fresh air, such as outside air for example. The outside air can be procured via one or more scooping mechanisms, such as an impact scoop or a flush scoop for example. Thus, the inlet 24 can be considered a fresh or outside air inlet. In an embodiment, the second medium is ram air drawn from a portion of a ram air circuit to be described in more detail below. Generally, the second medium A2 described herein is at an ambient pressure equal to an air pressure outside of the aircraft when the aircraft is on the ground and is between an ambient pressure and a cabin pressure when the aircraft is in flight.

The system 20 can further receive a third medium A3 at an inlet 28. In one embodiment, the inlet 28 is operably coupled to a volume 26, such as the cabin of an aircraft, and the third medium A3 is cabin discharge air, which is air leaving the volume 26 and that would typically be discharged overboard. In some embodiments, the system 20 is configured to extract work from the third medium A3. In this manner, the pressurized air A3 of the volume 26 can be utilized by the system 20 to achieve certain operations.

The environmental control system 20 includes a RAM air circuit 30 including a shell or duct, illustrated schematically in broken lines at 32, within which one or more heat exchangers are located. The shell 32 can receive and direct a medium, such as ram air for example, through a portion of the system 20. The one or more heat exchangers are devices built for efficient heat transfer from one medium to another. Examples of the type of heat exchangers that may be used, include, but are not limited to, double pipe, shell and tube, plate, plate and shell, adiabatic shell, plate fin, pillow plate, and fluid heat exchangers.

The one or more heat exchangers arranged within the shell 32 may be referred to as ram heat exchangers. In the illustrated, non-limiting embodiment, the ram heat exchangers include a first or primary heat exchanger 34 and a second or secondary heat exchanger 36. Within the heat exchangers 34, 36, ram air, such as outside air for example, acts as a heat sink to cool a medium passing there through, for example the first medium A1 and/or the second medium A2.

A fan 38 is a mechanical device that can force via push or pull methods a medium, such as ram air for example, through the shell 32 across the one or more ram heat exchangers 34, 36 at a variable cooling flow rate to control temperatures. As shown, the fan 38 is a separate component driven by any suitable means. Examples of such a fan include an electrically driven fan, a tip turbine fan, or a fan that is part of a simple cycle machine. However, in other embodiments, the fan 38 may part of a compression device 40 to be described in more detail below.

The system 20 additionally includes a compression device 40. In the illustrated, non-limiting embodiment, the compression device 40 is a mechanical device that includes components for performing thermodynamic work on a medium (e.g., extracts work from or applies work to the first medium A1, the second medium A2, and/or the third medium A3 by raising and/or lowering pressure and by raising and/or lowering temperature). Examples of a compression device 40 include an air cycle machine, a two-wheel air cycle machine, a three-wheel air cycle machine, a four-wheel air cycle machine, etc.

In the non-limiting embodiment of FIGS. 1-4, the compression device 40 is a four-wheel air cycle machine including a compressor 42 and a plurality of turbines. The compressor 42 is a mechanical device configured to raise a pressure of a medium and can be driven by another mechanical device (e.g., a motor or a medium via a turbine). Examples of compressor types include centrifugal, diagonal or mixed-flow, axial-flow, reciprocating, ionic liquid piston, rotary screw, rotary vane, scroll, diaphragm, air bubble, etc. As shown, the compressor 42 is configured to receive and pressurize the second medium A2.

In the illustrated embodiment, the compression device 40 includes a turbine 44, such as a fresh air turbine, a bleed turbine 46, and a power turbine 48 operably coupled to each other and the compressor 42 via a shaft 50. The turbines 44, 46, and 48 are mechanical devices that expand a medium and extract work therefrom (also referred to as extracting energy) to drive the compressor 42 via the shaft 50. The turbines 44, 46, and 48 are operable independently or in combination, to drive the compressor 42 via the shaft 50.

The system 20 additionally includes a dehumidification system. In the illustrated, non-limiting embodiment of FIG. 1, the dehumidification system includes a condenser 52 and a water extractor or collector 54 arranged downstream from the condenser 52. The condenser 52 and the water collector 54 may be arranged in fluid communication with the second medium A2. The condenser 52 is a particular type of heat exchanger and the water collector 54 is a mechanical device that performs a process of removing water from a medium. In the non-limiting embodiment of FIGS. 1, 3, and 5, the condenser 52 of the dehumidification system is illustrated as a separate heat exchanger located downstream from and arranged in fluid communication with an outlet of the second heat exchanger 36. However, the configuration of the at least one dehumidification system may vary.

Figure 2:
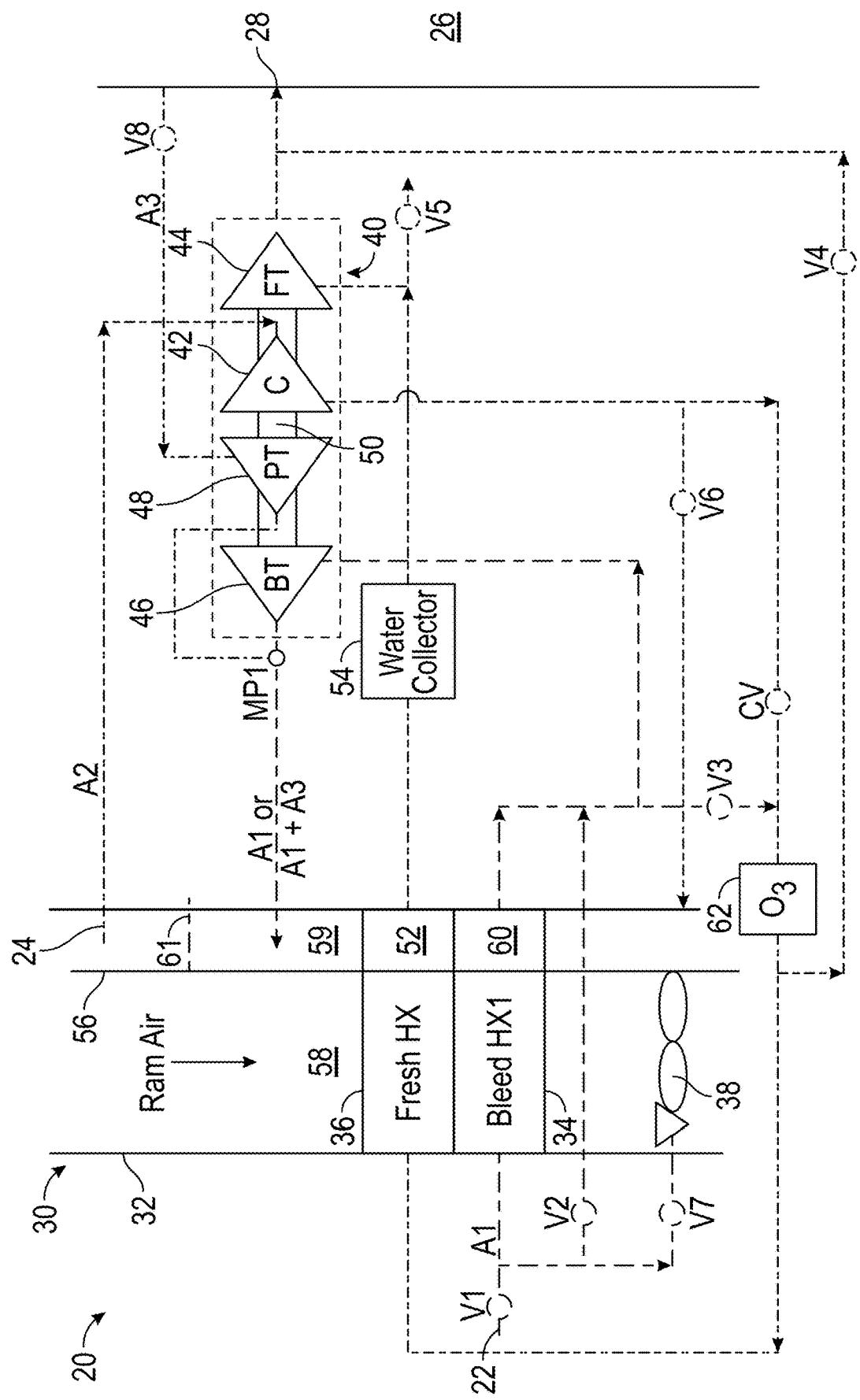
FIG. 2 is a simplified schematic of a system according to another embodiment.
Figure 4:
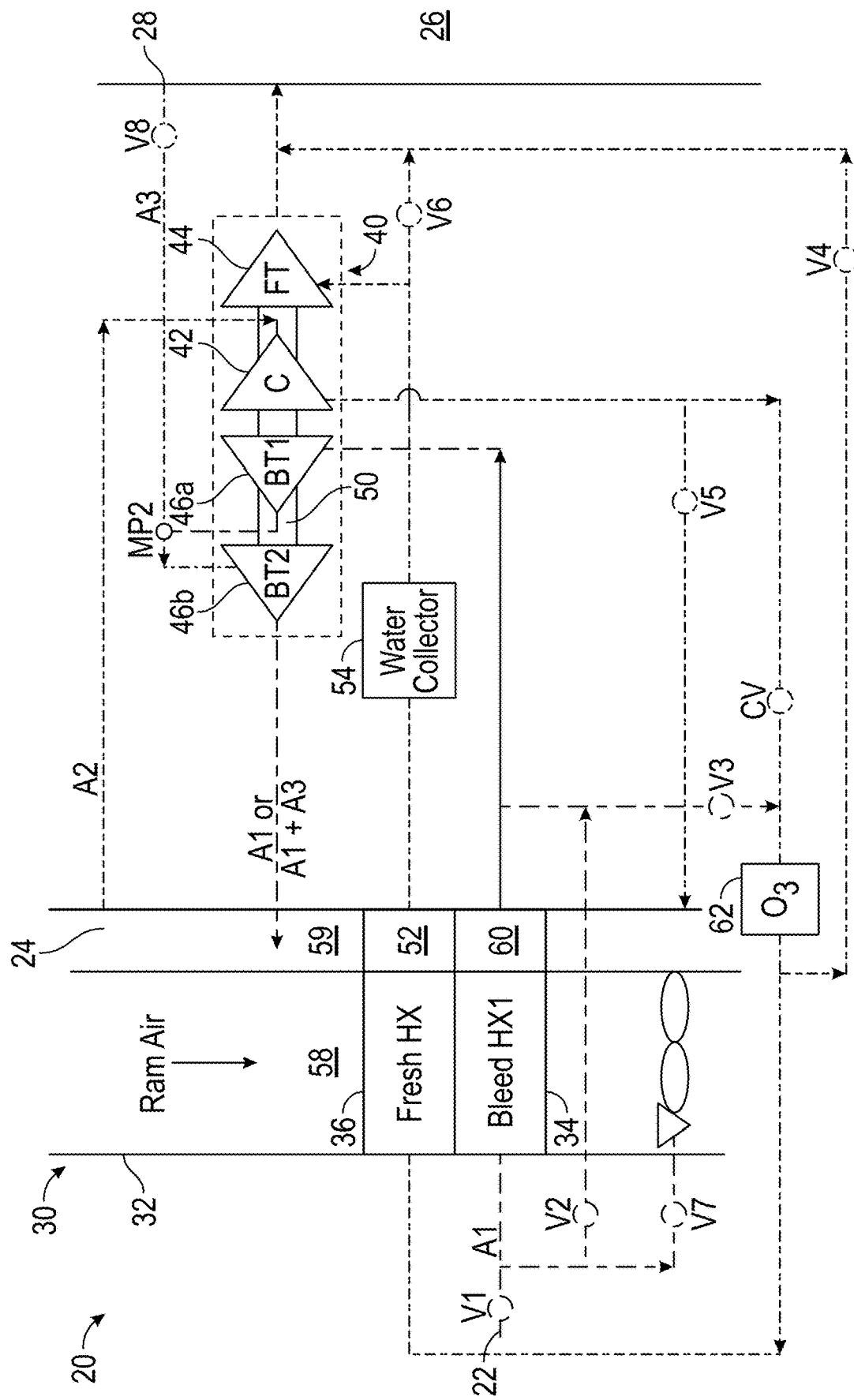
FIG. 4 is a simplified schematic of a system according to another embodiment.
Figure 6:
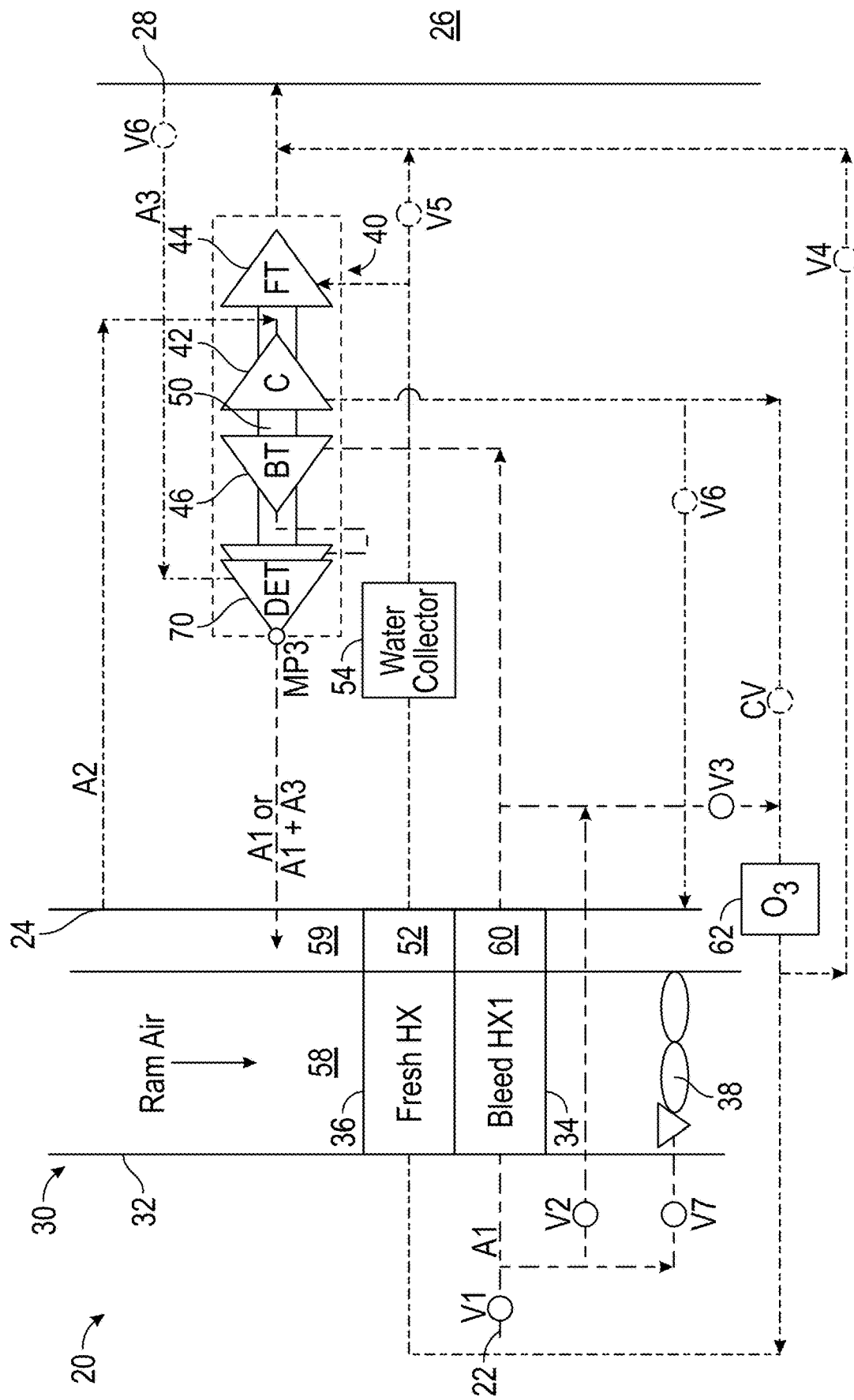
FIG. 6 is a simplified schematic of a system according to another embodiment.

In the non-limiting embodiments of FIGS. 2, 4, and 6, the condenser 52 is formed integrally with the secondary heat exchanger 36. For example, the second medium A2 is configured to flow through a first portion of the heat exchanger that forms the secondary heat exchanger, and then through a second, downstream portion of the heat exchanger, which forms the condenser. In such embodiments, although the entire heat exchanger is arranged within the ram air shell 32, a divider 56 wall may extend parallel to the flow of ram air through the shell 32 at the interface between the first and second portions of the heat exchanger to separate the ram air shell 32 into a distinct first region 58 and second region 59. Accordingly, the fan 38 is positioned to draw ram air through only the first region 58, across the primary heat exchanger 34 and the first portion that forms a secondary heat exchanger 36. A fluid flow, distinct from the ram air flow to be described in more detail below, is configured to flow through the second region 59, across the second portion of the heat exchanger that forms the condenser 52. In such a configuration, the ram air arranged within the first region 58 and the fluid flow provided to the second region 59 do not mix within the ram air shell 32. However, it should be understood that embodiments where the secondary heat exchanger 36 is arranged within the first region 58, and a condenser 52, separate from and arranged in fluid communication with an outlet of the secondary heat exchanger 36, is arranged within the second region 59 are also within the scope of the disclosure.

The elements of the system 20 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system. Valves can be operated by actuators, such that flow rates of the medium in any portion of the system 20 can be regulated to a desired value. For instance, a first valve V1 may be configured to control a supply of the first medium A1 to the system 20, and a second valve may be operable to allow a portion of a medium, such as the first medium A1, to bypass the ram air circuit 30. As a result, operation of the second valve V2 may be used to add heat to the system 20 and to drive the compression device 40 when needed. A third valve V3 may be operable in the event of a pack failure, such as where the system 20 does not have a sufficient flow of the second medium A2 to meet the demands of the cabin or other loads. In such instances, operation of valve V3 may be used to supplement the flow of second medium A2 with first medium A1, such as at a location upstream from the dehumidification system for example, to meet the demands of the aircraft.

Operation of a fourth valve V4 may be used to allow a portion of the second medium A2 to bypass the dehumidification system and the turbine 44 of the compression device 40 and operation of a fifth valve V5 may be configured to allow a portion of the second medium A2 output from the dehumidification system to bypass the turbine 44 of the compression device 40. In an embodiment, a sixth valve V6 is a surge control valve, operable to exhaust a portion of the second medium A2 output from the compressor 42 overboard or into the ram air circuit 30 to prevent a compressor surge. In an embodiment, a seventh valve V7 is configured to control a supply of a medium, such as the first medium A1 for example, to the fan 38, to drive operation of the fan 38.

A valve V8 may be configured to control a supply of the third medium A3 to the system 20, With continued reference to FIGS. 1 and 2, the system 20 is operable in a plurality of modes, selectable based on a flight condition of the aircraft. For example, the system 20 may be operable in a first, low altitude mode or a second, high altitude mode. The first, low altitude mode is typically used for ground and low altitude flight conditions, such as ground idle, taxi, take-off, and hold conditions, and the second, high altitude mode may be used at high altitude cruise, climb, and descent flight conditions.

In the first, low altitude mode, valve V1 and V7 are open, and a high pressure first medium A1, such as bleed air drawn from an engine or APU, is provided to the primary heat exchanger 34 and to the fan 38. Within the first heat exchanger 34, the first medium A1 is cooled via a flow of ram air, driven by the fan 38. As shown in FIG. 1, the cool first medium passes sequentially from the first heat exchanger 34 to another heat exchanger 60, where the first medium A1 is further cooled by another medium, distinct from the ram air. In other embodiments, best shown in FIG. 2, the heat exchanger 60 may be integrally formed with the heat exchanger that functions as the primary heat exchanger 34 and is positioned within the second region 59 of the ram air circuit 30.

From the heat exchanger 60, the further cooled first medium A1 is provided to the inlet of the bleed turbine 46. The high pressure first medium A1 is expanded across the bleed turbine 46 and work is extracted therefrom. The first medium A1 output from the bleed turbine 46 has a reduced temperature and pressure relative to the first medium A1 provided to the inlet of the bleed turbine 46. The first medium A1 at the outlet of the bleed turbine 46 may be used to cool the second medium A2 within the condenser 52, to be described in more detail below, and/or to cool the first medium A1 within the heat exchanger 60. This cooling may occur separately from (FIG. 1) or within the second region 59 of the ram air circuit 30 (FIG. 2). After receiving heat from the first medium A1 within heat exchanger 60, the first medium A1 may be exhausted overboard or outside the aircraft, or to a portion of the ram air circuit 30, such as downstream from all of the heat exchangers arranged therein. In an embodiment, best shown in FIG. 2, a wall or barrier 61 may be arranged at an upstream end of the second region 59 to prevent another medium, separate from the medium output from the compressing device 40 from passing through the second region 59. Although such a barrier 61 is illustrated in FIG. 2, it should be understood that any of the embodiments of the ram air system including a separate first and second region 58, 59 may include such a barrier 61.

The work extracted form the first medium A1 in the bleed turbine 46, drives the compressor 42, which is used to compress a second medium A2 provided from an aircraft inlet 24. As shown, the second medium A2, such as fresh air for example, is drawn from an upstream end of the ram air circuit 30 or from another source and provided to an inlet of the compressor 42. The act of compressing the second medium A2, heats the second medium A2 and increases the pressure of the second medium A2.

In some embodiments, the compressed second medium A2 output from the compressor 42 is provided to an ozone removal heat exchanger 62, before being provided to the secondary heat exchanger 36 where it is cooled by ram air. In the illustrated, non-limiting embodiment, the first medium A1 and the second medium A2 are configured to flow through the primary and second heat exchangers 34, 36, respectively, in the same direction relative to the ram air flow. However, embodiments where the first and second medium flow in different directions are also within the scope of the disclosure.

The second medium A2 exiting the secondary heat exchanger 36 is then provided to the condenser 52, where the second medium A2 is further cooled by the first medium A1 output from the bleed turbine 46. From the condenser 52, the second medium A2 is provided to the water collector 54 where any free moisture is removed, to produce cool medium pressure air. This cool pressurized second medium A2 then enters the turbine 44 where work is extracted from the second medium A2 and used to drive the compressor 42. The second medium output from the turbine 44 is then sent to one or more loads of the aircraft, such as to condition the pressurized volume or cabin 26.

The high-altitude mode of operation is similar to the low altitude mode of operation. However, in some embodiments, valve V2 may be open to allow at least a portion of the first medium A1 to bypass the primary heat exchanger 34 and heat exchanger 60. Valve V2 may be operated to control, and in some embodiments, maximize the temperature of the first medium A1 provided to the bleed turbine 46. As a result, the work extracted from the first medium A1 within the bleed turbine 46 may be optimized while exhausting the first medium A1 therefrom with a temperature suitable to function as a heat sink with respect to the condenser 52 and/or heat exchanger 60.

In the high-altitude mode of operation, the third medium A3, such as an exhaust of cabin air for example, is recirculated to the system 20 from the pressurized volume 26, through valve V8. The flow of the third medium A3 may be provided directly to an inlet of the power turbine 48. The additional work extracted from the third medium A3 in the power turbine 48, is used in combination with the work extracted from the first medium A1 to drive the compressor 42. As shown, the third medium A3 may be mixed at a mixing point MP1 with the first medium A1. In the illustrated, non-limiting embodiment, the mixing point is located downstream from an outlet of the bleed turbine 46 and the power turbine 48. In the high altitude mode of operation, this mixture of first medium and third medium A1+A3 may be used to cool the second medium A2 within the condenser 52, and/or to cool the first medium A1 within the heat exchanger 60, and then dumped overboard or into the ram air circuit 30.

The compressed second medium A2 output from the compressor 42 may follow the same flow path with respect to the secondary heat exchanger 36 and condenser 52, water collector 54, and turbine 44 as previously described for the low altitude mode of operation. However, in an embodiment, valve V5 is open in the high-altitude mode. As a result, at least a portion of the second medium A2 output from the condenser 52 bypasses the turbine 44 of the compression device.

Depending on the temperature and humidity conditions of the day, the second medium output from the condenser 52 may be too cold to provide directly to the cabin 26, via valve V5. In such instances, during the high-altitude mode of operation, valve V4 is opened, thereby allowing a portion of the heated second medium A2 output from the compressor 42 to mix with the cold second medium A2 upstream from an outlet of the system 20. Accordingly, valve V4 can be controlled to achieve a second medium A2 having a desired temperature for conditioning the cabin 26.

Figure 3:
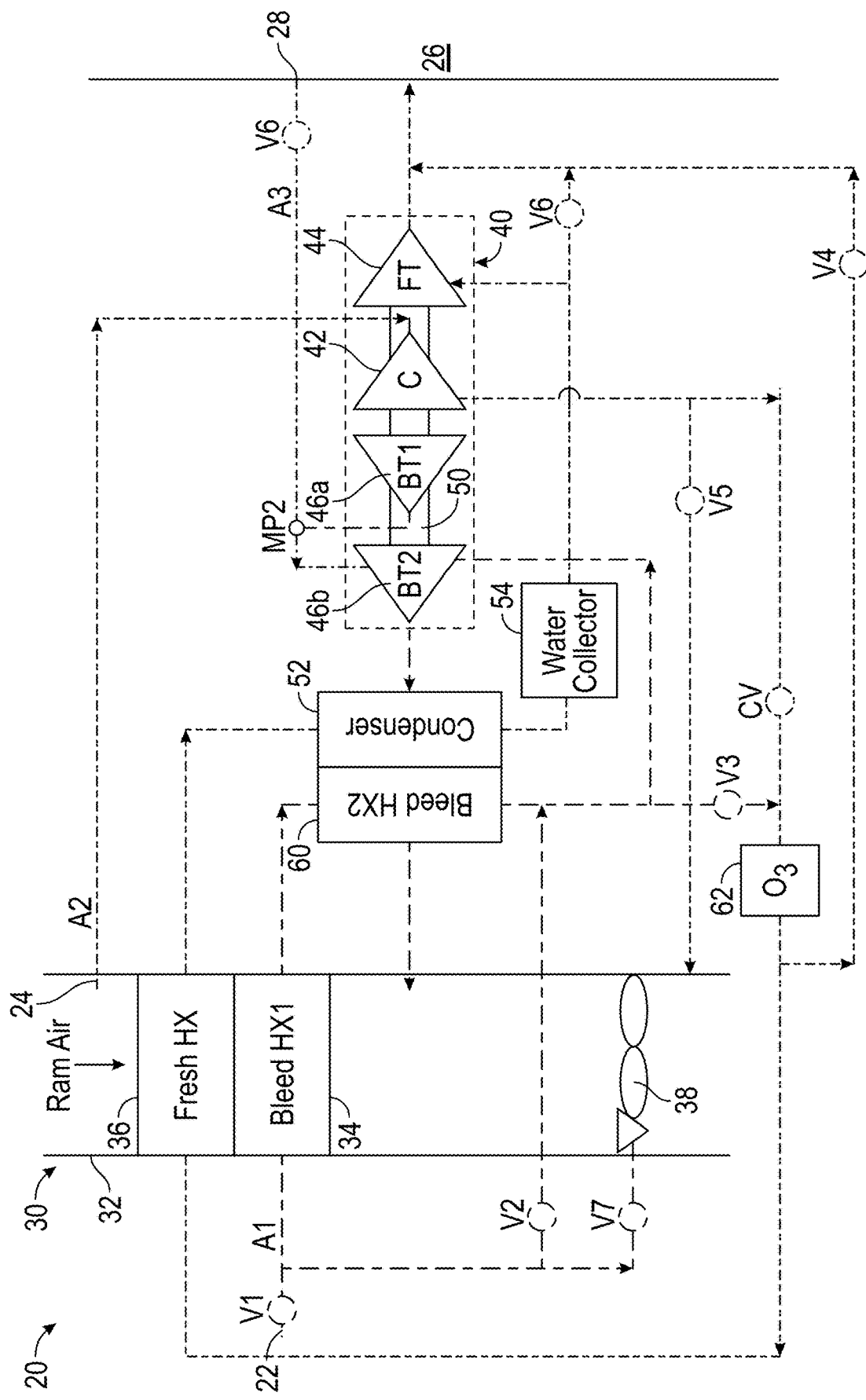
FIG. 3 is a simplified schematic of a system according to another embodiment.

With reference now to FIGS. 3 and 4, another configuration of the system 20 is illustrated. The system 20 is similar to the configuration of FIGS. 1 and 2; however, in the illustrated, non-limiting embodiment, the compression device 40 includes a second bleed turbine 46b in place of the power turbine 48. Accordingly, during both the low altitude and high-altitude modes of operation, the first medium A1 is provided to the first bleed turbine 46a then to the second bleed turbine 46b sequentially. The work extracted from the first medium A1 in both bleed turbines 46a, 46b is used to drive the compressor. Further, the first medium A1 output from the second bleed turbine 46b is used to cool the flows of medium within the condenser 52 and/or the heat exchanger 60. As previously described, in a high-altitude mode of operation, the third medium A3 is additionally provided to the system 20 and work is extracted therefrom. As shown, the third medium A3 is mixed at a mixing point MP2 with the first medium A1. In the illustrated, non-limiting embodiment, the mixing point MP2 is located downstream from an outlet of the first bleed turbine 46a and upstream from an inlet of the second bleed turbine 46b. By mixing the plurality of mediums within the air cycle machine, the complexity of the housing of the compressing device 40a is reduced since only a single outlet for both the first medium and the third medium is formed therein.

In an embodiment, the pressure ratio of one or more of the turbines of the compressing device 40 is reduced relative to existing turbines. As used herein, the term "pressure ratio" is intended to describe the ratio of the pressure of the medium provided to an inlet of the turbine and the pressure of the medium provided at the outlet of the turbine. In an embodiment, such as embodiments of the system 20 including a plurality of turbines 46a, 46b arranged in series relative to a flow of one or more mediums, the pressure ratio of each of the turbines may be reduced compared to conventional turbines.

Figure 5:
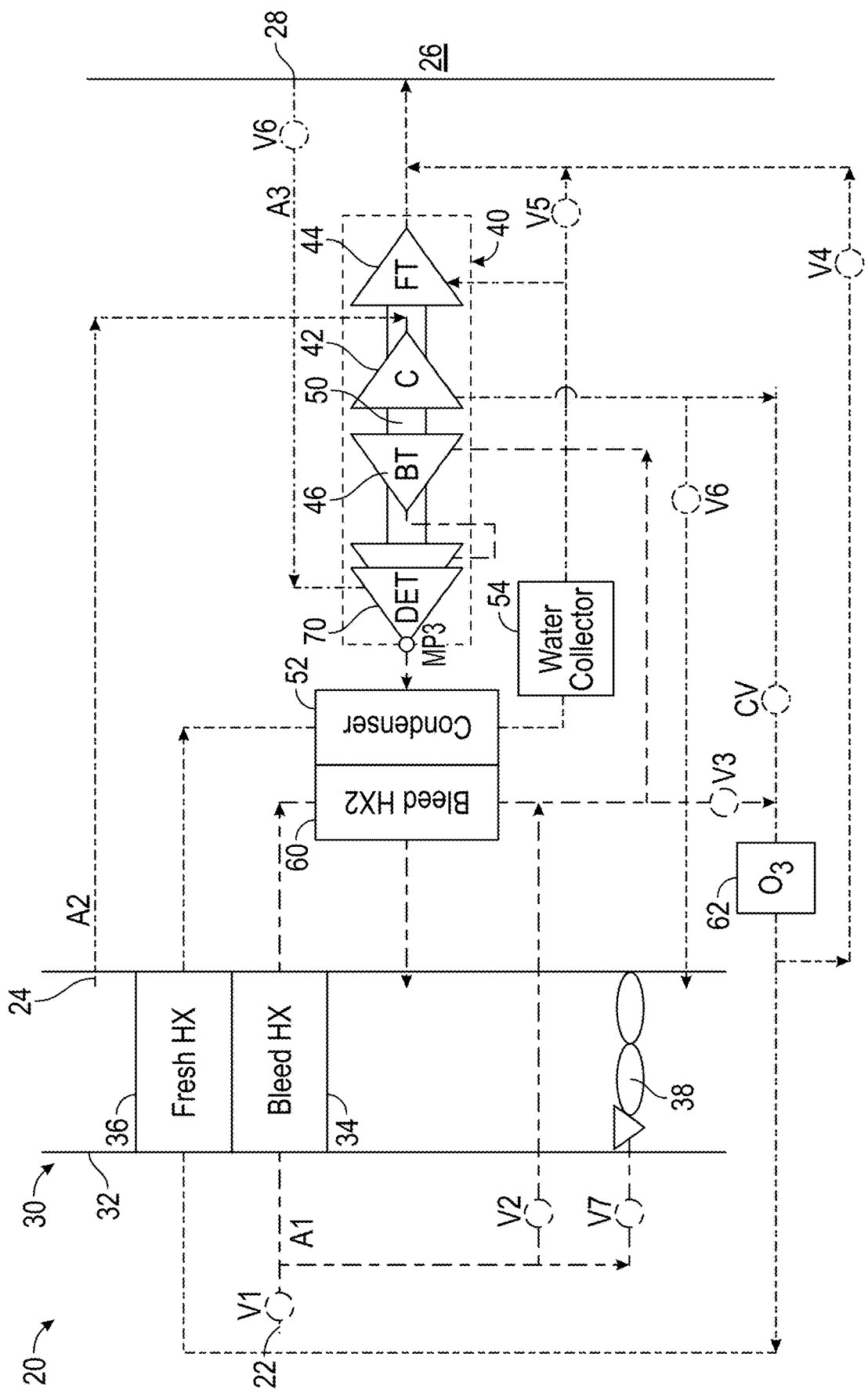
FIG. 5 is a simplified schematic of a system according to another embodiment.

Yet another configuration of the system 20 is illustrated in the non-limiting embodiment of FIGS. 5 and 6. As shown, the system 20 is substantially similar to the previous configurations. However, the compression device 40 of the system 20 of FIGS. 5 and 6 includes a dual entry turbine 70 in place of the power turbine or the second bleed turbine. As shown, the dual entry turbine 70 is configured to receive flows of different mediums. A dual entry turbine typically has multiple nozzles, each of which is configured to receive a distinct flow of medium at a different entry point, such that multiple flows can be received simultaneously. For example, the turbine 70 can include a plurality of inlet flow paths, such as an inner flow path and an outer flow path, to enable mixing of the medium flows at the exit of the turbine 70. The inner flow path can be a first diameter, and the outer flow path can be a second diameter. Further, the inner flow path can align with one of the first or second nozzles, and the outer flow path can align with the other of the first or second nozzles.

In an embodiment, one of the inlets or nozzles of the dual entry turbine 70 is arranged downstream from and in series with an outlet of the bleed turbine 46. Accordingly, during both the low altitude and high-altitude modes of operation, the first medium A1 is provided to bleed turbine 46 then to the dual entry turbine 70 sequentially. The work extracted from the first medium A1 in both the bleed turbine 46 and the dual entry turbine 70 is used to drive the compressor. Further, the first medium A1 output from the second bleed turbine 46b is used to cool the flows of medium within the condenser 52 and/or the heat exchanger 60. As previously described, in a high-altitude mode of operation, the third medium A3 is additionally provided to the system 20 and work is extracted therefrom. As shown, the third medium A3 may be provided to a second inlet or nozzle of the dual entry turbine 70. In such embodiments, the mixing point MP3 of the third medium A3 and the first medium A1 can be at the dual entry turbine 70, such as at an outlet of the turbine 70 for example, or alternatively, may be downstream therefrom.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of an aircraft comprising:
   a ram air circuit including:
      a ram air shell having at least one heat exchanger positioned therein;
      a divider arranged within the ram air shell to separate the ram air shell into a first region and a second region, the at least one heat exchanger being arranged within both the first region and the second region, wherein a first medium is configured to flow through the first region and a second, distinct medium is configured to flow through the second region;
   a dehumidification system arranged in fluid communication with the ram air circuit; and
   a compression device arranged in fluid communication with the ram air circuit and the dehumidification system, the compression device including a compressor and a turbine;
   wherein the medium configured to flow through the second region is exhausted from the compression device.

2. The environmental control system of claim 1, wherein the at least one heat exchanger includes a first heat exchanger arranged within the first region and a second heat exchanger arranged within the second region, the second heat exchanger being separate from and arranged in fluid communication with an outlet of the first heat exchanger.

3. The environmental control system of claim 1, wherein the first medium is ram air.

4. The environmental control system of claim 1, wherein the medium configured to flow through the second region is exhausted from the turbine of the compression device.

5. The environmental control system of claim 1, wherein the medium configured to flow through the second region is bleed air.

6. The environmental control system of claim 1, wherein the medium configured to flow through the second region is a mixture of bleed air and cabin discharge air.

7. The environmental control system of claim 1, wherein the at least one heat exchanger includes a first portion arranged within the first region and a second portion arranged within the second region, the second portion of the at least one heat exchanger is integrally formed with the first portion.

8. The environmental control system of claim 7, wherein the second portion of the heat exchanger is a condenser of the dehumidification system.

9. The environmental control system of claim 1, further comprising a fan arranged within the ram air shell to move the first medium across the at least one heat exchanger within the first region.

10. The environmental control system of claim 9, wherein the fan is separate from the compression device.

11. The environmental control system of claim 10, wherein the fan is electrically powered.

12. The environmental control system of claim 10, wherein the fan is driven by a flow of medium provided thereto.

* * * * *